United States Patent [19]

Ameyama

[11] 4,394,663

[45] Jul. 19, 1983

[54] INK JET PRINTING APPARATUS

[75] Inventor: Minoru Ameyama, Tokyo, Japan

[73] Assignee: Ricoh Company, Ltd., Tokyo, Japan

[21] Appl. No.: 305,427

[22] Filed: Sep. 25, 1981

[30] Foreign Application Priority Data

Oct. 4, 1980 [JP] Japan ............................. 55-139211

[51] Int. Cl.$^3$ ............................................. G01D 15/18

[52] U.S. Cl. ..................................................... 346/75

[58] Field of Search ........................... 346/1.1, 75, 140

[56] References Cited

U.S. PATENT DOCUMENTS 3,562,757 2/1971 Bischoff .............................. 346/1.1

3,947,851 3/1976 Chen et al. ....................... 346/75 X 3,977,007 8/1976 Berry et al. .......................... 346/1.1

4,086,601 4/1978 Fillmore et al. ...................... 346/75

*Primary Examiner*—Donald A. Griffin

*Attorney, Agent, or Firm*—David G. Alexander

[57] ABSTRACT

A charge deflection type ink jet printing apparatus adjusts, in detecting and controlling a deflection of charged ink droplets, the size (height or width) of characters with utmost accuracy by varying the number of guard droplets. In combination with the adjustment by the variation in the number of guard drops, the direction of ejection of an ink jet head and/or the position of a deflection detecting electrode may be adjusted.

5 Claims, 2 Drawing Figures

INK JET PRINTING APPARATUS

BACKGROUND OF THE INVENTION

The present invention relates to charge deflection type ink jet printing apparatus which can accurately adjust the size (height or width) of characters to be printed by controlling the number of so-called "guard drops" during a detection and control of an amount of deflection.

Ink jet printing apparatus are known in the art in which ink is supplied into an ink jet head and subjected to pressure oscillation by a vibrator. This pressure oscillation causes the ink to be ejected from the head and separate into droplets. Where it is desired to print a drop on a sheet of paper, an electrostatic charge is applied to the droplets. The charged droplets are electrostatically deflected by deflection electrodes and hit the paper to print the dot. Where it is not desired to print a dot, the droplets are not charged and are therefore not deflected by the deflection electrodes and hit a gutter instead of the paper.

In many applications, it is desirable to be able to vary the size (height or width) of the characters or other images being printed by the ink jet printing apparatus. This has been done in the prior art by either one of three different methods: moving an ink jet head upwardly or downwardly to vary the direction of ejection of ink droplets, moving a deflection detecting electrode either vertically or longitudinally to vary its position thereof, and moving both the ink jet head and deflection detecting electrode at the same time. All these methods, however, rely on manual operations of an adjusting screw or the like which offers only a limited accuracy to the adjustment.

Another factor on which amounts of deflection of charged ink droplets depends is the number of guard drops, that is, the number of uncharged ink droplets which intervene between adjacent charged ink droplets. The deflection increases as the number of guard drops or spacing between adjacent charged ink droplets is so increased as to substantially eliminate mutual influence between the charged ink droplets. Stated another way, the deflection decreases with a decrease in the number of guard drops. The present invention has been elaborated in view of such a relation between the deflection and the number of guard drops.

SUMMARY OF THE INVENTION

An ink jet printing apparatus embodying the present invention comprises an ink jet head, a vibrator for applying pressure oscillation to ink in the jet head thereby causing the ink to be ejected from the ink jet head and separated into droplets, a charging electrode for charging the ink droplets and a deflection electrode for deflecting the charged ink droplets, and is characterized by a control unit for controlling the size of images printed by the printing apparatus. The control unit is constructed to vary the number of guard drops, i.e., uncharged ink droplets, interposed between two adjacent ink droplets and thereby a printed dot size in accordance with a desired image size.

In accordance with the present invention, in the event of a detection and control of a deflection, the number of guard drops is varied in a compensatory manner to accurately adjust the size (height or width) of characters and thereby provide characters of a desired size. A farther accurate adjustment is achievable by so increasing or decreasing the number of guard drops after varying an ejection direction of an ink jet head and/or a position of a deflection detecting electrode for a rough adjustment of the ejection direction at the time of a deflection detection and control.

It is an object of the present invention to provide an ink jet printing apparatus which can vary the size (height or width) of characters to be printed very easily yet very accurately.

It is another object of the present invention to provide a generally improved ink jet printing apparatus.

Other objects, together with the foregoing, are attained in the embodiment described in the following description and illustrated in the accompanying drawing.

DESCRIPTION OF THE PREFERRED EMBODIMENT

While the ink jet printing apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
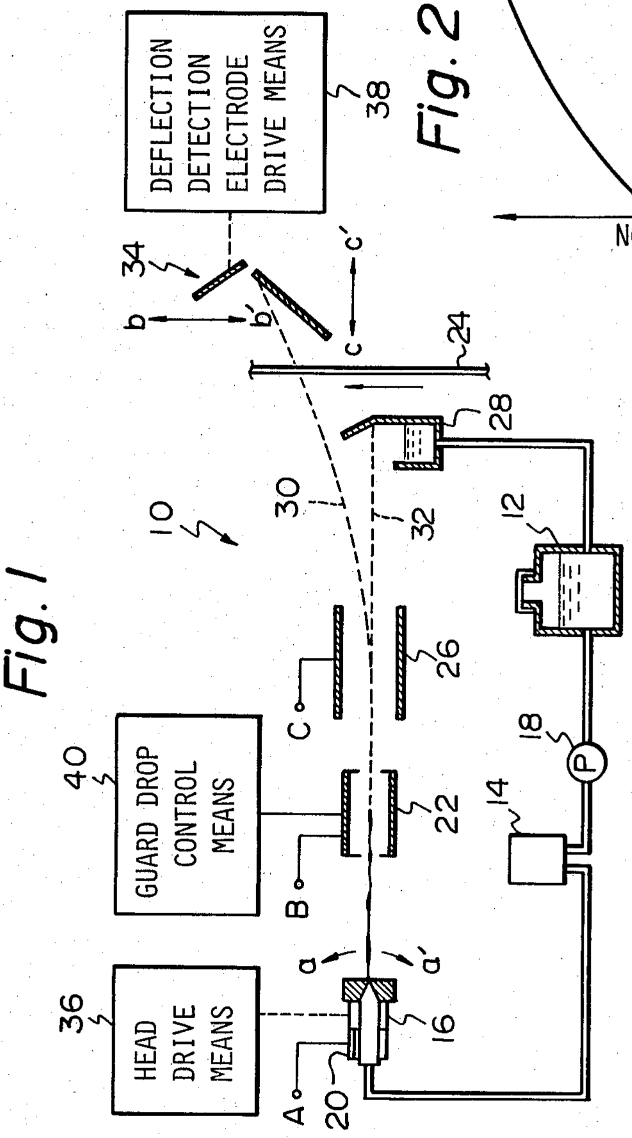
FIG. 1 is a schematic view of an exemplary ink jet printing apparatus to which the present invention is applicable.

Referring now to FIG. 1 of the drawing, an ink jet printing apparatus embodying the present invention is generally designated by the reference numeral 10 and comprises an ink reservoir or tank 12. Ink is continuously pumped from the tank 12 via an accumulator 14 to an ink ejection head 16 by a pump 18. Drive signals A are applied to a piezoelectric oscillator 20 provided to the head 16. The signals A cause the ink to be ejected from the head 16 in the form of a stream which separates into minute particles at a short distance from the head 16. Some of the ink particles are electrostatically charged by a charging electrode 22 when charging signals B are applied to the electrode 22. Where it is desired to print a dot on the surface of a moving sheet of paper 24, a signal C is applied to a deflecting electrode 26 which deflects the charged ink particles upwardly above a gutter 28 into the sheet 24 as indicated at 30. Uncharged particles in addition to charged particles passing the electrode 26 when the signal C is not applied are not deflected but hit the gutter 28 and are returned to the tank 12 as indicated at 32. The reference numberal 34 designates a deflection detecting electrode for detecting an amount of deflection of the charged ink particles.

In the ink jet printing apparatus 10, the size (height or width) of characters to be printed has heretofore been adjusted by either one of the previously mentioned three different methods. Namely, the ink jet head 16 may be moved vertically as indicated by a double-headed arrow a—a' by a head drive means 36; or the deflection deflecting electrode 34 may be moved vertically as indicated by a double-headed arrow b—b' or longitudinally as indicated by a double-headed arrow c—c' by a deflection electrode drive means 38; or both the ink jet head 16 and deflection detecting electrode 34 may be moved at the same time. However, all these methods are directed only to quite rough adjustment and encounter difficulty in affording a desirable accuracy.

Figure 2:
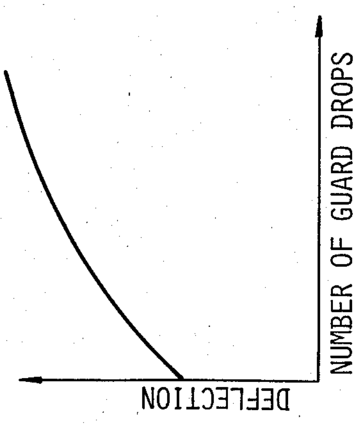
FIG. 2 is a graph representing a relationship between the number of guard drops and the deflection.

In order to settle such a problem inherent in a prior art apparatus, the present invention contemplates to adjust the size of characters to be printed (height or width) to desired one with an utmost accuracy. In so doing, the present invention pays attention to an inherent relation between the deflection and the number of guard drops as indicated by a curve in FIG. 2, that is, the deflection grows larger as the number of guard drops is increased and smaller as the latter is decreased.

Referring again to FIG. 1, an ink jet printing apparatus according to the present invention comprises a guard drop control means 40 for controlling the number of guard drops in addition to the various components of the prior art apparatus. The guard drop control means 40 is constructed such that it adjusts the number of guard drops or uncharged ink droplets between adjacent charged ink droplets to desired one when charging signals B are supplied to the charging electrode 22 to charge desired ink droplets. It is noteworthy here that the adjustment is quite accurate since a charge of deflection attributable to an increase or decrease of one guard drop is insignificant.

Various modifications will become possible for those skilled in the art after receiving the teachings of the present disclosure without departing from the scope thereof.

What is claimed is:

1. An ink jet printing apparatus including an ink jet head, vibrator means for applying pressure oscillation to ink in the ink jet head thereby causing the ink to be ejected from the ink jet head and separated into droplets, charging means for charging the ink droplets and deflection means for deflecting the charged ink droplets, characterized by comprising:

control means for controlling a size of images printed by the printing apparatus, the control means comprising coarse control means for adjustably moving at least one of the ink jet head, charging means and deflection means and fine control means for varying the number of guard drops composed of uncharged ink droplets between charged ink droplets.

2. An ink jet printing apparatus as claimed in claim 1, in which the fine control means is constructed to increase the number of guard drops to increase the size of images.

3. An ink jet printing apparatus as claimed in claim 1, in which the coarse control means is constructed to vary an ink ejection direction of the ink jet head.

4. An ink jet printing apparatus as claimed in claim 1, further comprising charged ink deflection detecting means, the coarse control means being further constructed to vary a deflection detection position of the deflection detecting means.

5. An ink jet printing apparatus as claimed in claim 1, in which the size of images to be printed by the printing apparatus comprises at least one of the height and width of characters.

* * * * *